(12) United States Patent
St. John

(10) Patent No.: US 10,713,980 B2
(45) Date of Patent: Jul. 14, 2020

(54) WINDOW MOUNTABLE ILLUMINATED SIGN ASSEMBLY

(71) Applicant: Susan St. John, Stuart, FL (US)

(72) Inventor: Susan St. John, Stuart, FL (US)

( * ) Notice: Subject to any disclaimer, the term of this patent is extended or adjusted under 35 U.S.C. 154(b) by 0 days.

(21) Appl. No.: 16/235,223

(22) Filed: Dec. 28, 2018

(65) Prior Publication Data

US 2019/0206289 A1 Jul. 4, 2019

Related U.S. Application Data

(60) Provisional application No. 62/611,180, filed on Dec. 28, 2017.

(51) Int. Cl.
| | |
|---|---|
| *G09F 13/04* | (2006.01) |
| *G09F 13/08* | (2006.01) |
| *G09F 21/04* | (2006.01) |
| *B60Q 1/50* | (2006.01) |
| *B60Q 1/26* | (2006.01) |

(52) U.S. Cl.
CPC ......... *G09F 13/0413* (2013.01); *B60Q 1/268* (2013.01); *B60Q 1/2696* (2013.01); *B60Q 1/503* (2013.01); *G09F 13/08* (2013.01); *G09F 21/04* (2013.01); *G09F 2013/044* (2013.01)

(58) Field of Classification Search
CPC ...... G09F 13/0413; G09F 21/04; G09F 13/08; G09F 2013/044; B60Q 1/2696; B60Q 1/268; B60Q 1/503
See application file for complete search history.

(56) References Cited

U.S. PATENT DOCUMENTS

| | | | | |
|---|---|---|---|---|
| 4,860,476 A | * | 8/1989 | Hall | G09F 21/04 40/593 |
| 6,271,814 B1 | * | 8/2001 | Kaoh | G09F 9/30 340/815.45 |
| 2003/0140536 A1 | * | 7/2003 | Bilyeu | G09F 21/04 40/574 |
| 2003/0167666 A1 | * | 9/2003 | Close, Jr. | G09F 9/33 40/452 |
| 2003/0204979 A1 | * | 11/2003 | Blease | G09F 21/04 40/597 |

(Continued)

FOREIGN PATENT DOCUMENTS

WO WO-03081565 A1 * 10/2003 ............. B60Q 1/503

*Primary Examiner* — Cassandra Davis
(74) *Attorney, Agent, or Firm* — Mark C. Johnson; Johnson Dalal

(57) ABSTRACT

A window mountable illuminated sign assembly configured to removably couple to a vehicle window and that comprises a sign housing coupled to a translucent front panel defining an interior cavity. The interior cavity holding an LED panel including a plurality of LED lights disposed in a tightly spaced configuration with respect to one another. The translucent front panel coupled to and surrounded by a flange that extends outwardly from the front surface of the translucent front panel and is capable of flexing and deforming. The sign assembly also comprises a plurality of suction cup fasteners individually and independently capable of flexing and deforming. The assembly further includes a variety of power options as well as a remote control operably configured to communicate signals that control various aspects and features of the sign assembly.

16 Claims, 11 Drawing Sheets

FIG. 1

(56) References Cited

U.S. PATENT DOCUMENTS

| | | | |
|---|---|---|---|
| 2007/0006497 A1* | 1/2007 | Alberts | G09F 21/04 40/593 |
| 2009/0033481 A1* | 2/2009 | Kuvantrarai | B60O 1/44 340/479 |
| 2009/0084009 A1* | 4/2009 | Vandergriff | G09F 13/18 40/546 |
| 2014/0130387 A1* | 5/2014 | Pod | G09F 9/33 40/575 |

* cited by examiner

WINDOW MOUNTABLE ILLUMINATED SIGN ASSEMBLY

CROSS-REFERENCE TO RELATED APPLICATION

This application claims priority to U.S. Provisional Patent Application No. 62/611,180 filed Dec. 28, 2017, the entirety of which is incorporated by reference.

FIELD OF THE INVENTION

The present invention relates generally to vehicle safety signs, and, more particularly, relates to a window mountable illuminated sign assembly.

BACKGROUND OF THE INVENTION

Typically, vehicle-mounted safety signs are used by a variety of different users in order to inform and notify near-by motorists of additional safety precautions which should be taken because they personally affect the user. These signs are often mounted on the rear interior or exterior windshield of a vehicle to display the message to other motorists, emergency personnel, and to the general public. The use of these signs can be particularly beneficial for users who are carrying certain passengers or have a particular condition which would otherwise be unknown to others. Usually, a user displays notice of these otherwise concealed details to request a level of courtesy, respect, alertness, and attentiveness from other motorists, emergency personnel, and the general public.

Often, these vehicle window-mounted signs utilize a variety of adhesive methods to attach the sign to either the exterior or interior surface of the vehicle's window. These adhesive methods may include suction cups, stickers, static clings, Velcro, peel-and-stick adhesives, etc.

Many known vehicle-mounted safety signs are simple structures, comprising a flat surface displaying words and/or graphics that adhere to the surface of a vehicle window. However, because driving is a part of everyday life for the typical person, most motorists often become inattentive and robotic, and therefore, these simple vehicle-mounted safety signs often go unnoticed and fail to attract a motorist's attention.

Other known vehicle-mounted safety signs are capable of illuminating and feature a remote control which has the ability to change the sign's illumination modes. Problematically, however, these devices fail to include structural or functional features to focus the light facing outwardly against an automobile's rear window, thereby providing a more enhanced display. Moreover, these devices do not incorporate a variety of options to electrically charge the sign, for example, solar panel, batteries, and a rechargeable lithium battery. Additionally, these devices do not utilize motion sensors or brake-activation to power, activate, or illuminate the sign.

Therefore, a need exists to overcome the problems with the prior art as discussed above.

SUMMARY OF THE INVENTION

The invention provides a window mountable illuminated sign assembly that overcomes the hereinafore-mentioned disadvantages of the heretofore-known devices and methods of this general type and that effectively and efficiently communicates messages to other motorists on the road utilizing noticeable illumination techniques as well as a remote control capable of controlling various aspects and features of the sign, while simultaneously enabling the user to electrically charge the sign through a variety of options.

With the foregoing and other objects in view, there is provided, in accordance with the invention, a window mountable illuminated sign assembly comprising a sign housing with a rear surface, an upper end, a lower end opposing the upper end of the sign housing, and a sidewall having an upper sidewall edge spanning a perimeter thereon. The window mountable illuminated sign assembly also includes an electrical circuit disposed within the sign housing which is electrically and operably coupled to a plurality of light emitting diodes (LEDs) operably configured to project light and is oriented in a front-facing orientation (i.e., spanning in a direction from the rear surface of the sign housing to the front surface of the front panel). The window mountable illuminated sign assembly also includes a flange coupled to and surrounding the upper sidewall edge. The flange is made of a flexible and deformable polymeric material (e.g., natural rubber, acrylic, PVC, acrylonitrile butadiene styrene/polycarbonate, polypropylene, or any other flexible and deformable material) and has a sidewall with an inner surface and a distal flange edge. The window mountable illuminated sign assembly also includes a translucent front panel directly coupled to the inner surface of the sidewall of the flange. The translucent front panel has a front surface opposing the rear surface of the sign housing and is interposed between the rear surface of the sign housing and the distal flange edge. Moreover, the translucent front panel includes a lettered and contrasting (visually perceptive by a user when light shines thereon) indicia (e.g., design, logo, words, etc.) disposed on the front surface of the front panel. The window mountable illuminated sign assembly also includes a plurality of suction cup fasteners coupled to the sign housing, each defining a concave cut cavity facing the front-facing orientation.

In accordance with another feature, the window mountable illuminated sign assembly further comprises an LED panel disposed proximal and coupled to an inside surface of the sign housing. The LED panel defines a front surface area defined by a perimeter and has the plurality of LEDs disposed on a front surface thereon in a tightly spaced configuration (e.g., preferably being approximately 0.25 inches from one another, but no greater than within approximately 1-2 inches of one another) that substantially cover (e.g., preferably covering ≥90%, but in every embodiment covering ≥60%) the LED panel front surface area.

In accordance with a further feature of the present invention, the front panel further comprises a front surface area defined by a perimeter of the front panel, the front surface area substantially equals (e.g., equal or within approximately 10-15% difference) the LED panel front surface area.

In accordance with a further feature of the present invention, the front panel is substantially planar.

In accordance with the present invention, the window mountable illuminated sign assembly further comprises at least one photovoltaic cell coupled to the sign housing and facing the front-facing orientation. The photovoltaic cell is electrically coupled to the electrical circuit.

In accordance with another feature, the window mountable illuminated sign assembly further comprises a direct current (DC) power source that is electrically and operably coupled to the electrical circuit.

In accordance with another feature, the window mountable illuminated sign assembly further comprises a sensor coupled to the sign housing and operably configured to detect a motion in a near proximity (e.g., within approximately 15-20 feet) to front surface of the front panel. Upon detection of the motion, the sensor sends an activation signal to the electrical circuit.

In accordance with a further feature of the present invention, the window mountable illuminated sign assembly further comprises a first plurality of suction cup arms, each with one of the plurality of suction cup fasteners coupled thereto, and a second plurality of suction cup arms, each with one of the plurality of suction cup fasteners coupled thereto. The window mountable illuminated sign assembly also includes a first plurality of sign sidewall edge recesses defined on sidewall of the sign housing, each sized and shaped to receive one of the first plurality of suction cup arms and second plurality of sign sidewall edge recesses defined on sidewall of the sign housing, each sized and shaped to receive one of the second plurality of suction cup arms, wherein the first and second plurality of suction cup arms dispose the plurality of suction cup fasteners in a configuration with the front panel interposed between the plurality of suction cup fasteners and an inside surface of the sign housing.

In accordance with another feature, the first plurality of sign sidewall edge recesses are disposed on the upper end of the sidewall of the sign housing and the second plurality of sign sidewall edge recesses are disposed on the lower end of the sidewall of the sign housing.

In accordance with another feature, the first and second plurality of suction cup arms dispose the plurality of suction cup fasteners proximal (e.g., at or within approximately 1-2 inches behind or in front of) to the distal flange edge of the sidewall of the flange.

In accordance with another feature, the first and second plurality of suction cup arms dispose a distal terminal end of the plurality of suction cup fasteners in a configuration with the distal flange edge of the sidewall of the flange interposed between the distal terminal end of the plurality of suction cup fasteners and the front panel.

In accordance with another feature, each of the plurality of suction cup fasteners further comprises a distal terminal end, wherein the distal flange edge of the sidewall of the flange is interposed between the distal terminal end of each plurality of suction cup fasteners, respectively, and the front panel.

In some embodiments, in combination with a vehicle having a plurality of windows, including a rear window, the improvement comprising a rear-window mounted illuminated sign assembly that includes a sign housing with a rear surface, an upper end, a lower end opposing the upper end of the sign housing, and a sidewall having an upper sidewall edge spanning a perimeter thereon. The rear-window mounted illuminated sign assembly further includes an electrical circuit disposed within the sign housing and electrically coupled to a power source and electrically and operably coupled to a plurality of light emitting diodes (LEDs) operably configured to project light and oriented toward the rear window of the vehicle. The rear-window mounted illuminated sign assembly further includes a flange coupled to and surrounding the upper sidewall edge, of a polymeric material, having a sidewall with an inner surface and a distal flange edge directly coupled to the rear window of the vehicle, the flange disposed in a flexed and deformed configuration. The rear-window mounted illuminated sign assembly further includes a translucent front panel directly coupled to the inner surface of the sidewall of the flange, having a front surface opposing the rear surface of the sign housing and interposed between the rear surface of the sign housing and the distal flange edge, and having a lettered and contrasting indicia disposed on the front surface of the front panel. The rear-window mounted illuminated sign assembly further includes a plurality of suction cup fasteners coupled to the sign housing, each defining a concave cut cavity facing the rear window of the vehicle and each directly coupled to the rear window of the vehicle to retain the sign housing thereon.

In accordance with another feature, the distal flange edge, around a perimeter of the sidewall of the flange, is flush with the rear window of the vehicle.

Although the invention is illustrated and described herein as embodied in a window mountable illuminated sign assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
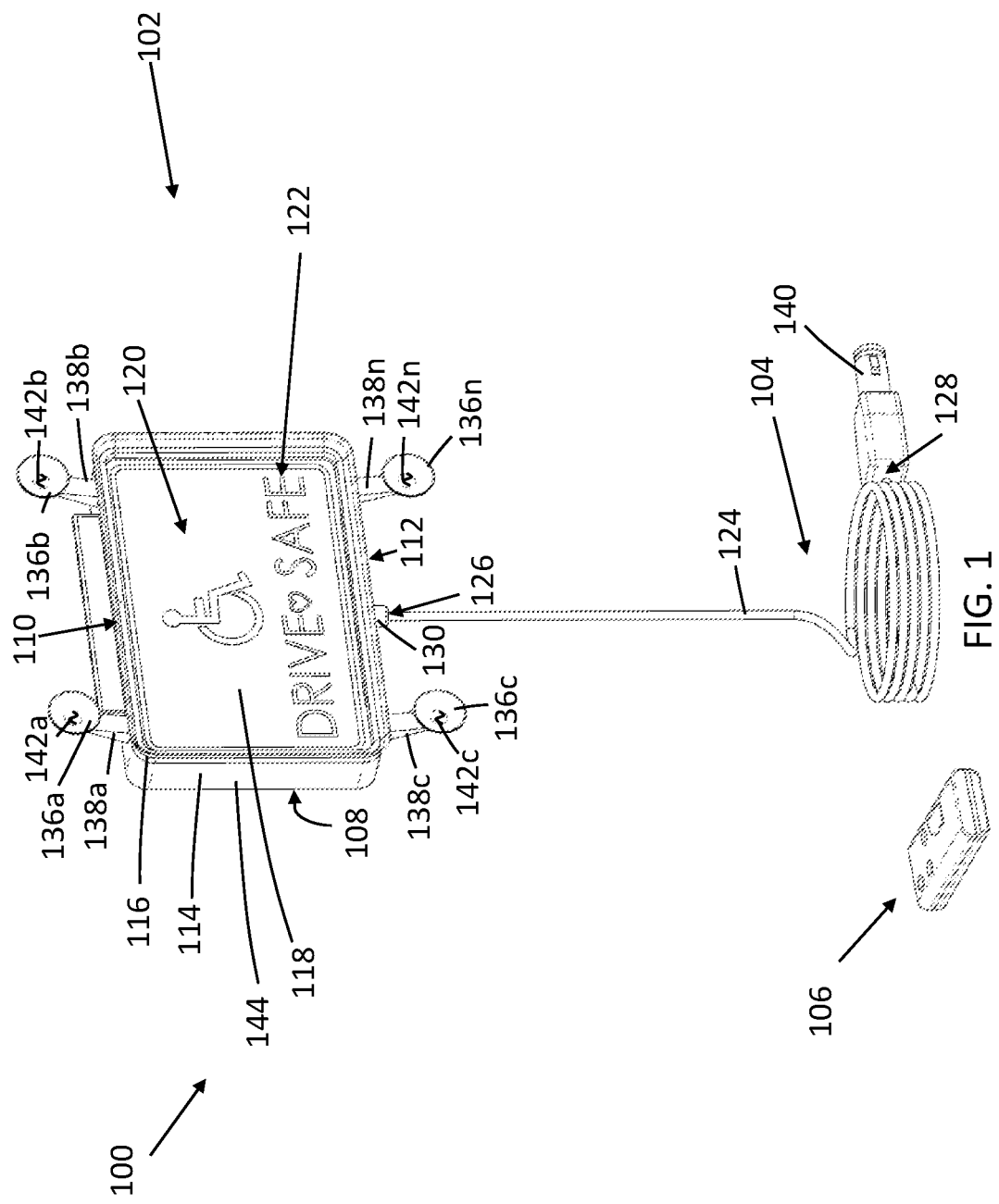
FIG. 1 is a perspective view of a window mountable illuminated sign assembly according to one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms. Therefore, specific structural and functional details disclosed herein are not to be interpreted as limiting, but merely as a basis for future claims and as a representative basis for teaching one of ordinary skill in the art to variously employ the present invention in virtually any appropriately detailed structure. Further, the terms and phrases used herein are not intended to be limiting; but rather, to provide an understandable description of the invention. It is believed that the invention will be better understood from a consideration of the following description in conjunction with the drawing figures, in which like reference numerals are carried forward. The figures of the drawings are not drawn to scale.

The present invention provides a novel and efficient window mountable illuminated sign assembly which offers a user friendly and noticeable illuminated sign as well as a remote control capable of controlling various different aspects and features of the window mountable illuminated sign assembly. Moreover, embodiments of the invention provide a variety of options which enable the user to electrically charge the sign. In addition, embodiments of the present invention also provide motion sensitivity or brake activation in order to illuminate the sign.

Referring now to FIG. 1, one embodiment of the present invention is shown in a perspective view. FIG. 1, along with other figures depicted herein, shows several advantageous features of the present invention, but, as will be described below, the invention can be provided in several shapes, sizes, combinations of features and components, and varying numbers and functions of the components. The first example of a window mountable illuminated sign assembly 100, as shown in FIG. 1, includes a sign housing 102. The sign housing 102 includes a sign shell 144 coupled to a translucent front panel 118. Said another way, the front panel 118 may permit light to pass through, and may, in some embodiments, may be transparent. The sign shell 144 includes a rear surface 108, an upper end 110, a lower end 112 opposing the upper end 110, and a sidewall 114. The translucent front panel 118 includes a front surface 120 opposing the rear surface 108 of the sign shell 144. The translucent front panel 118 also includes a lettered and contrasting indicia 122 disposed on the front surface 120 which is designed to be visually perceptive by an outside viewing user when the assembly 100 is illuminated and light shines thereon.

The sign housing 102 further includes a plurality of suction cup fasteners 136*a-n*, where "n" represents any number greater than one, coupled to the sign housing 102 through use of a plurality of suction cup arms 138*a-n*, where "n" represents any number greater than one. The amount of suction cup arms 138*a-n* and suction cup fasteners 136*a-n* correspond with respect to one another. Said another way, there are an equal amount of suction cup arms 138*a-n* as there are suction cup fasteners 136*a-n*. The assembly 100 may also include a wire connection 104 operably configured to provide power and charge to the sign housing 102. The wire connection 104 includes a cord 124 having a first end 126 and a second end 128. The first end 126 is coupled to a molded connector cover 130. The second end 128 is communicatively and/or electrically coupled to a cigarette lighter plug 140 suitable to plug into most cars, trucks, and RVs. The assembly 100 may further include a remote control 106. The remote control 106 is operably configured to communicate wirelessly with the window mountable illuminated sign assembly 100.

In a further embodiment, the suction cup fasteners 136*a-n* may each define a plurality of concave cut cavities 142*a-n*, where "n" represents any number greater than one. The concave cut cavities 142*a-n* each face the front-facing orientation. Said another way, concave cut cavities 142*a-n* may face in a direction away from the rear surface 108 of the sign shell 144. In the preferred embodiment, the suction cup fasteners 136*a-n* are disposed along the upper end 110 and the lower end 112 of the housing 102 to provide a secure and effective coupling configuration. As such, there may be two suction cup fasteners 136*a*, 136*b* on the upper end 110 proximal to the left and right ends of the sidewall 114, respectively, and two suction cup fasteners 136*c*, 136*n* on the lower end 112 proximal to the left and right ends of the sidewall 114, respectively. In other embodiments, the suction cup fasteners 136a-n may be disposed in any location along the upper end 110, lower end 112, or sidewall 114.

In other embodiments, instead of the suction cup fasteners 136a-n, other fastening mechanisms may be used to securely retain the sign housing 102 to a surface of a vehicle (not shown). This includes Velcro, stickers, tape, hooks, gluing, adhering, or any other method for securing two components together.

In yet other embodiments, instead of the suction cup arms 138a-n, other fastening mechanisms may be used to securely retain the suction cup fasteners 136a-n to the sign housing 102. This includes gluing, adhering, or any other method for securing two components together. In some embodiments, the plurality of suction cup arms 138a-n may be incorporated as part of the continuous structure of sign housing 102.

Still referring to FIG. 1, in a further embodiment, the sign housing 102 includes a flange 116 coupled to and surrounding the upper end 110, lower end 112, and sidewall 114 of sign shell 144. The flange 116 shaped and sized to receive the translucent front panel 118. Moreover, the flange 116 may be of a flexible and deformable polymeric material (e.g., natural rubber, acrylic, PVC, acrylonitrile butadiene styrene/polycarbonate, polypropylene), or any other flexible and deformable material.

In some embodiments, the flange 116 may be selectively removably coupled to the sign shell 144. In other embodiments, the flange 116 may frictionally fit and surrounding the upper end 110, lower end 112, and sidewall 114 of sign shell 144 for easy removal. In other embodiments, the flange 116 may be permanently fastened to the sign housing 102.

In some embodiments, the front panel 118 may be selectively removably coupled to the sign shell 144. In other embodiments, the front panel 118 may frictionally fit within the flange 116 and seat within an inner sidewall of the flange 116 quick and easy removal or replacement. In yet other embodiments, the front panel 118 may be permanently fastened to the sign housing 102. In some embodiments, the lettered and contrasting indicia 122 may be at least one, without limitation, of a design, logo, picture, word(s), or any combination thereof.

Figure 2:
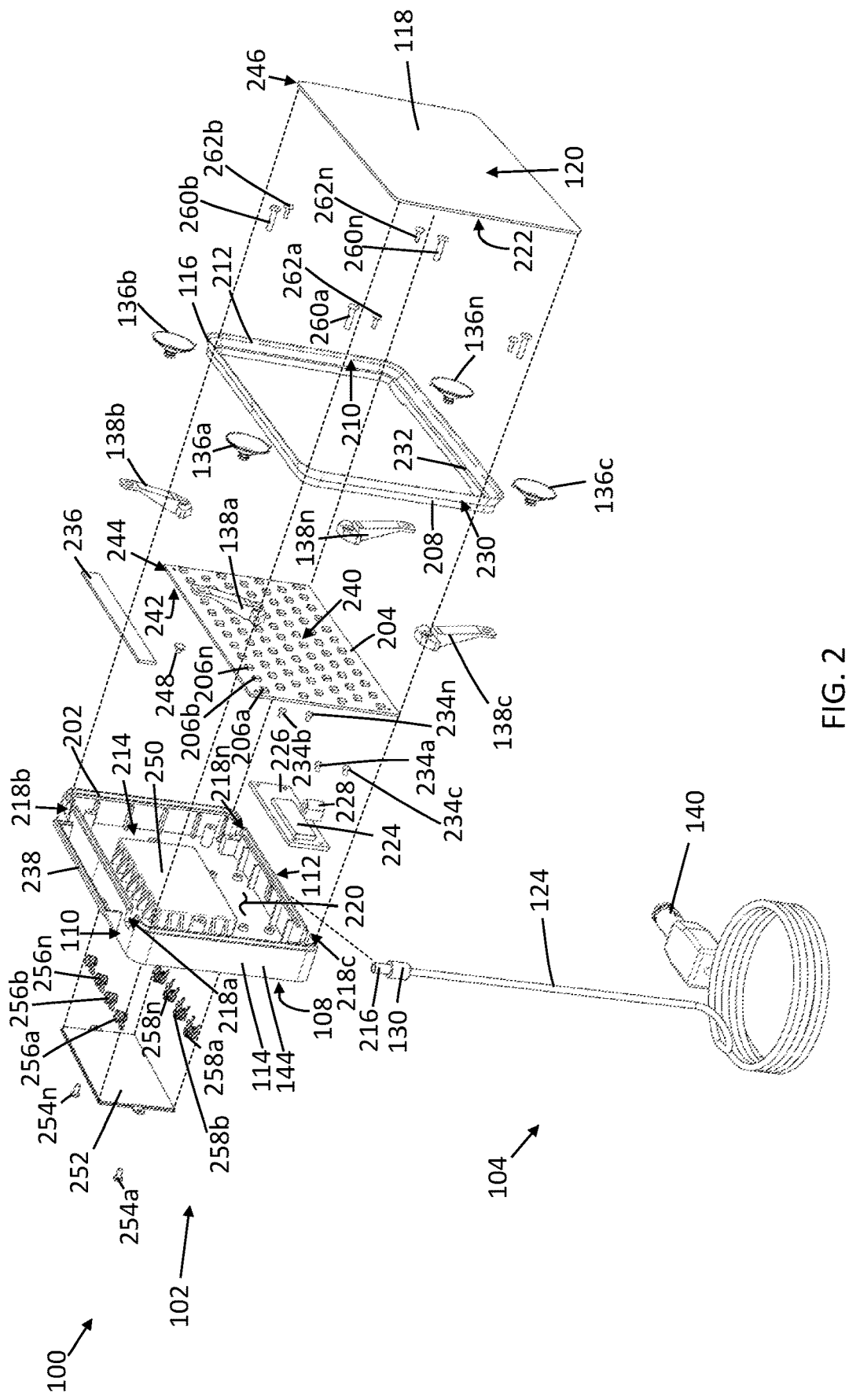
FIG. 2 is an exploded view of the housing in FIG. 1 in accordance with one embodiment of the present invention.

With reference to FIG. 2, which illustrates a perspective view of the assembly 100 showing the sign housing 102 in an exploded state, the sign shell 144 further includes an interior surface 214 opposing the rear sidewall surface 108. The sidewall 114 can be seen extending perpendicularly from the interior surface 214 to define, with the rear sidewall 108, an interior cavity 220. The sidewall 114 includes an upper sidewall edge 202 spanning a perimeter thereon.

The upper sidewall edge 202 may be discontinuous and have a plurality of sign sidewall edge recesses 218a-n, where "n" represents any number greater than one. The sign sidewall edge recesses 218a-n may be each shaped and sized to receive a portion of the suction cup arms 138a-n. The amount of recesses 218a-n and suction cup arms 138a-n correspond with respect to one another. In other embodiments, the upper sidewall edge 202 may be a continuous structure, said another way, the upper sidewall edge 202 may not include any of the plurality of sign sidewall edge recesses 218a-n.

In a further embodiment, the translucent front panel 118 further includes a perimeter edge 246 and a rear surface 222 opposing the front surface 120. The perimeter edge 246 defining the surface areas of the translucent front panel 118. In one embodiment, the front panel 118 may be selectively removable and substantially planar to not interfere with the window upon which it is coupled.

The sign shell 144 and the translucent panel 118 are coupled to each other such that the rear surface 222 of the translucent panel 118 faces the interior surface 214 of the sign shell 144 and defines an interior space therebetween (including the interior cavity 220) to accommodate an LED panel 204. Once the assembly 100 is assembled, the LED panel 204 is disposed within the interior cavity 220 created by the housing 102.

In one embodiment, the LED panel 204 is a substantially flat digital panel which includes an outer perimeter edge 244 defining a front surface 240 and a rear surface 242. The front surface 240 of the LED panel 204 consists of a plurality of light emitting diodes (LEDs) 206a-n, where "n" represents any number greater than one, or other light emitting components that work to facilitate in the display the lettered and contrasting indicia 122. In the preferred embodiment, the plurality of LEDs 206a-n are disposed in a tightly spaced configuration (e.g., being approximately 0.25 inches from one another, but no greater than within approximately 1-2 inches of one another) and substantially cover (≥90%) the front surface 240 of the LED panel 204. In other embodiments, the LEDs 206a-n are broadly spaced (more than 1-2 inches from one another) and cover approximately 60% or more of the front surface 240 of the LED panel 204. The LEDs 206a-n are operably configured to project light and oriented in a front-facing orientation (spanning in a direction opposite from the rear surface 108 of the sign housing 102 and in a direction toward the front surface 120 of the translucent front panel 118). Said another way, the LEDs 206a-n project light either directly on or proximal to the rear surface 222 of the translucent front panel 118. The plurality of LEDs 206a-n enhance viewing of the lettered and contrasting indicia 122. The lighting may especially be useful at night when ambient lighting is minimal. The LED panel 204 may include, without limitation, a light bulb, an LED, and/or a fluorescent light source.

In a further embodiment, the LED panel 204 may be powered by an electrically and operably coupled rechargeable lithium battery 224 also disposed within the interior cavity 220. The rechargeable lithium battery 224 is electrically and operably coupled to a PCB (protection circuit board) 226 for transfer of energy. The LED panel 204 is also electrically and operably coupled to the PCB 226. The PCB 226 includes an electrically and operably coupled DC power socket 228. In other embodiments, the DC power socket 228 may instead any other type of power socket (e.g., USB, AC). In an exemplary embodiment, the molded connector cover 130 of the wire connection 104 may comprise a DC power adapter 216, however, in other embodiments, the molded connector cover 130 may comprise any other type of connector (e.g., USB, AC) of a complementary configuration to the power socket 228. Once assembled, the sign housing 102 is selectively removably coupled to the wire connection 104 through the DC power socket 228 disposed on the lower end 112 of the sign housing 102.

In a further embodiment, a surface area defined by the perimeter edge 246 of the translucent front panel 118 and the surface area defined by the outer perimeter edge 244 of the LED panel 204 are substantially equal (e.g., equal or within approximately 10-15% difference).

In a further embodiment, the LED panel 204 is attached proximal to the interior surface 214 of the sign shell 144 through a plurality of screw members 262a-n, where "n" represents any number greater than one. In other embodiments, the LED panel 204 may couple to the sign shell 144 in any manner able to adhere, such as gluing, adhering, or any other method for securing two components together.

In a further embodiment, the PCB 226 is coupled to the interior surface 214 of the sign shell 144 through a plurality of screw members 234a-n, where "n" represents any number greater than one. In other embodiments, the PCB 226 may couple to the interior surface 214 of the sign shell 144 in any manner able to adhere, such as gluing, adhering, or any other method for securing two components together.

In a further embodiment, the flange 116 is coupled to and surrounds the upper sidewall edge 202. The flange 116 may couple to the upper sidewall edge 202 in any manner able to adhere, this includes frictionally fitting on the sidewall edge 202, gluing, adhering, and/or any other method for securing two components together. The flange 116 includes an inner surface 210 and an outer surface 230 opposing the inner surface 210 that surround the flange 116. Moreover, the flange 116 comprises a sidewall 208 and a distal flange edge 212. Disposed on the sidewall 208 and before the distal flange edge 212 is a ridge 232, shaped and sized to retain the translucent front panel 118. Once the sign housing 102 is assembled, the ridge 232 extends perpendicularly away from the inner surface 210 of the sidewall 208, wherein the translucent front panel 118 would seat on top of the ridge 232 and be retained by the sidewall 208, e.g., using compression and/or friction. When the sign assembly 100 is assembled, the distal flange edge 212 extends outwardly in front of the translucent front panel 118. The various components disposed within the housing 102 may be coupled together and retained through using a plurality of screw members 260a-n, where "n" represents any number greater than one.

Figure 9:
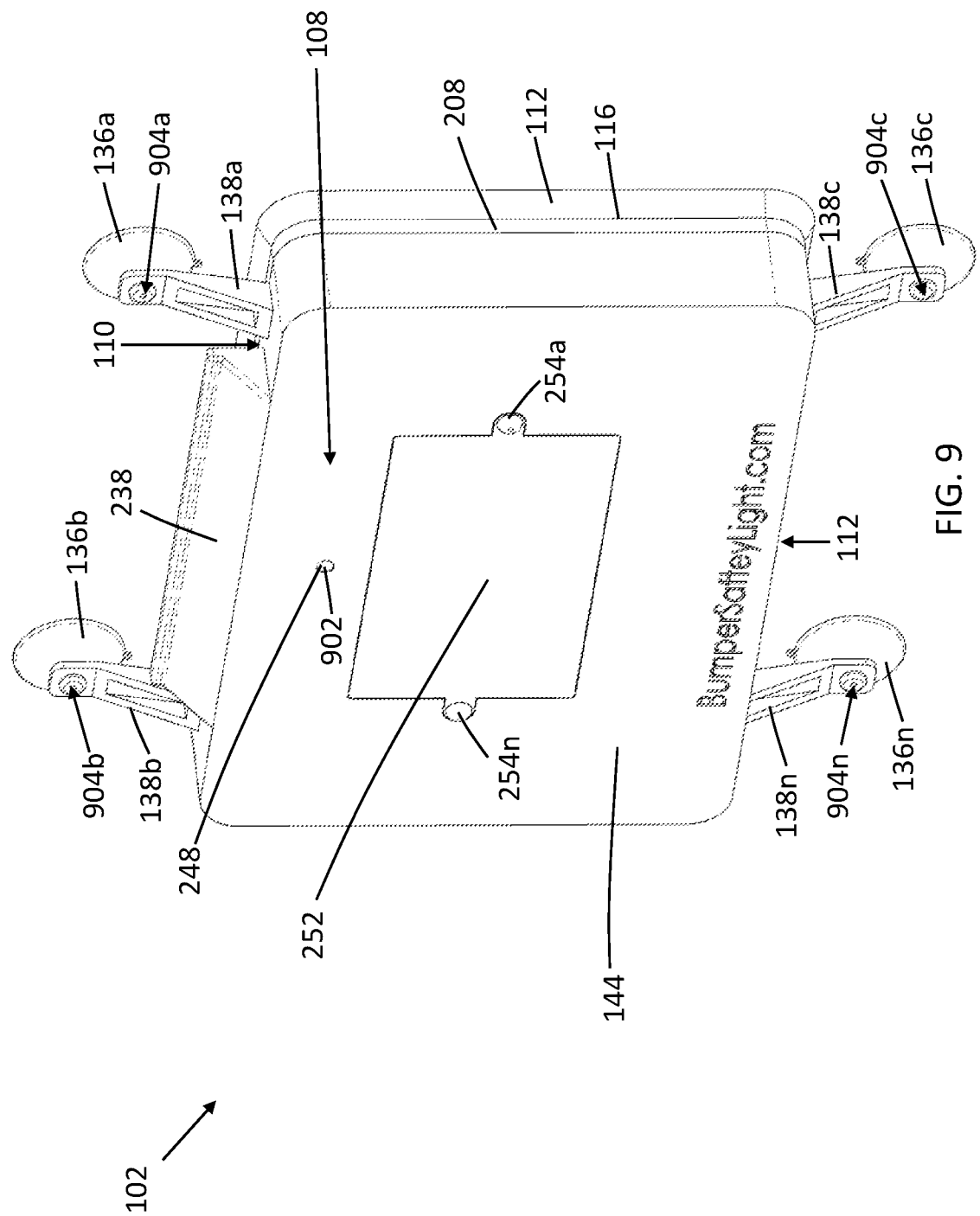
FIG. 9 is a perspective view of the housing in FIG. 1 in accordance with one embodiment of the present invention.

Referring to FIG. 2 and FIG. 9, the sign housing 102 further includes a back-facing LED 248 oriented in a rear-facing orientation (i.e., in a direction opposite from the front surface 120 of the translucent front panel 118). Access to the back-facing LED 248 is provided by shaped orifice 902 on the rear surface 108 of the sign housing 102. For effective user notification, the back-facing LED 248 is operably configured to illuminate when the sign assembly 100 is turned on.

Figure 3:
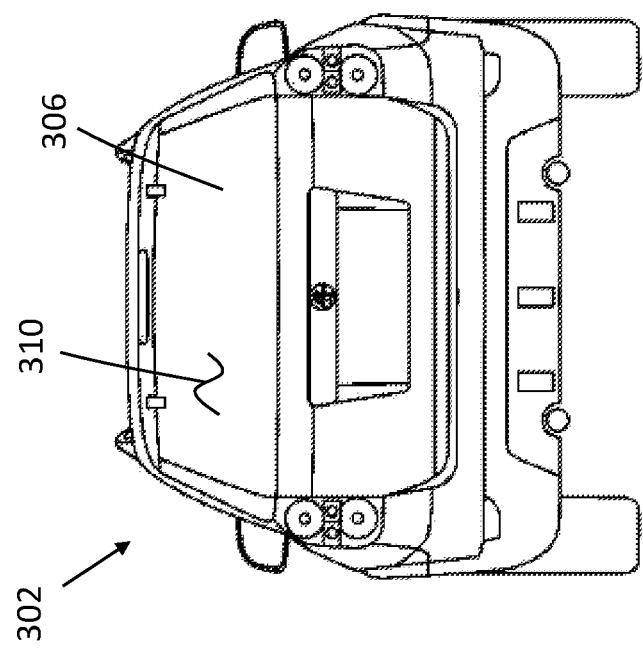
FIG. 3 are illustrations of the rear of exemplary vehicles which may incorporate the window illuminated sign assembly, in accordance with one embodiment of the present invention, specifically a sedan and an SUV.
Figure 3:
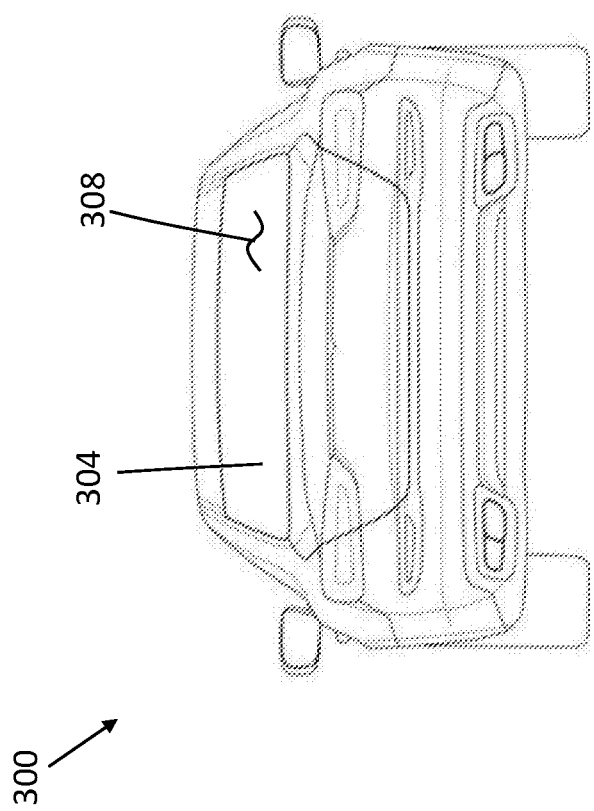
Figure 4:
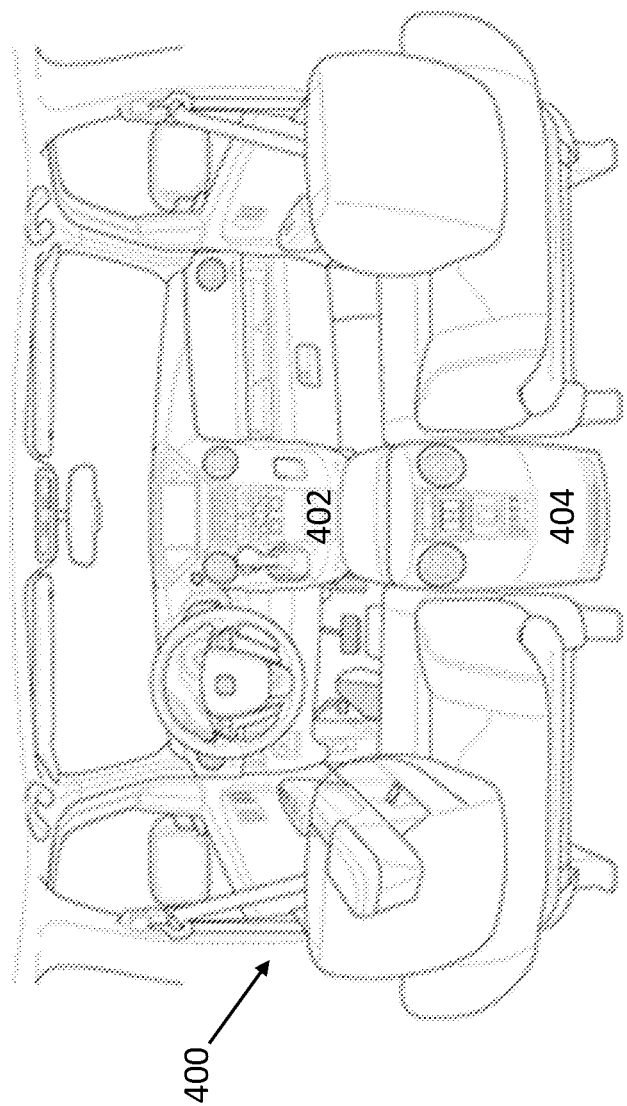
FIG. 4 is an illustration of exemplary cigarette receptacle locations employed within the sedan and SUV of FIG. 3.

FIG. 3 shows two examples of standard vehicles, specifically a sedan 300 and an SUV (Sports Utility Vehicle) 302, which may be used in combination with the window mountable illuminated sign assembly 100. As shown in FIG. 3, vehicles 300, 302 include rear windows 304, 306 on which the sign housing 102 (not shown) may be mounted for optimal visibility of the lettered and contrasting indicia 122. The rear windows 304, 306 include exterior surfaces 308, 310 and interior surfaces (not shown) opposing the exterior surfaces 308, 310. The sign housing 102 is designed to adhere to the interior surface of the rear windows 304, 306 through use of the plurality of suction cup fasteners 136a-n and display the lettered and contrasting indicia 122 from within the interior surfaces. The sign housing 102 is advantageously facing outwardly away from the interior (not shown) of the vehicles 300, 302 for viewing by a surrounding public (e.g., other motorists, emergency personnel).

With reference to FIGS. 1-4, the cigarette lighter plug 140 of the second end 128 of wire connection 104 may be inserted into any location 402, 404 where conventional cigarette lighter receptacles (not shown) are usually placed within a vehicle interior 400. As those of skill in the art will appreciate, the conventional cigarette lighter receptacles provide users a DC power source within the vehicle interior 400. The wire connection 104 may transfer power from the cigarette lighter receptacles (not shown) of the vehicle interior 400 to the cigarette lighter plug 140, through the cord 124, to DC power adapter 216 (which may include a driver to covert incoming power into an energy source with a desired amperage), and into both the PCB 226 and the rechargeable lithium battery 224 of the sign housing 102 through the DC power socket 228. The rechargeable lithium battery 224 is operably configured to collect and store the energy transferred from the cigarette lighter receptacles for use when the wire connection 104 is not plugged into locations 402, 404.

In some embodiments, best depicted in FIGS. 2 and 9-11, the window mountable illuminated sign assembly 100 may include a solar panel with at least one photovoltaic cell 236 electrically coupled to the PCB 226 to beneficially charge the rechargeable lithium battery 224. To provide sufficient sunlight to the photovoltaic cell 236, the solar panel is disposed in the front-facing orientation on the upper end 110 of the sign shell 144 and encased within a solar panel housing 238.

Those of skill in the art will appreciate that photovoltaic cells are electrical devices that convert the energy of light, whether it be artificial light or sunlight, directly into electricity by photovoltaic effect, which may be a physical and/or a chemical phenomenon. Advantageously, the photovoltaic cell 236 converts the radiant energy into electricity that can be used by electronic devices, electrical components of the assembly 100, and the like. In one embodiment, the photovoltaic cell 236 is made of monocrystalline silicon. In another embodiment, the photovoltaic cell 236 may be made of polycrystalline silicon, multicrystalline silicon, or a similar type of semiconductor material. In one embodiment, the photovoltaic cell 236 may produce an efficiency rate of 12% to 20%. The "efficiency rate" is defined herein as the rate at which the solar-cell converts the solar energy into electricity. In another embodiment, the photovoltaic cell 236 may produce an efficiency rate of greater than 20%. In order to collect and transfer solar energy, as sunlight penetrates the photovoltaic cell 236, the sunlight's photons create a negatively charged electron and a positively charged ion, i.e., a "hole." The negative electrons and positive ions drift toward opposite terminals of the photovoltaic cell 236, creating a voltage difference in the photovoltaic cell 236. When a load is electrically coupled to the terminals, electron current flows towards the positively charged holes and useful electrical power becomes available at the load. While the operation of a photovoltaic cell is known by those of skill in the art, in one embodiment, the photovoltaic cell 236 is operably configured to generate approximately 4-6 volts and approximately 0.5-2.5 amps. In a preferred embodiment, the photovoltaic cell 236 will generate approximately 5 Watts (5 volts at 1.0 amps), or another amount of current and voltage sufficient to charge the rechargeable lithium battery 224 housed in the assembly 100.

Figure 10:
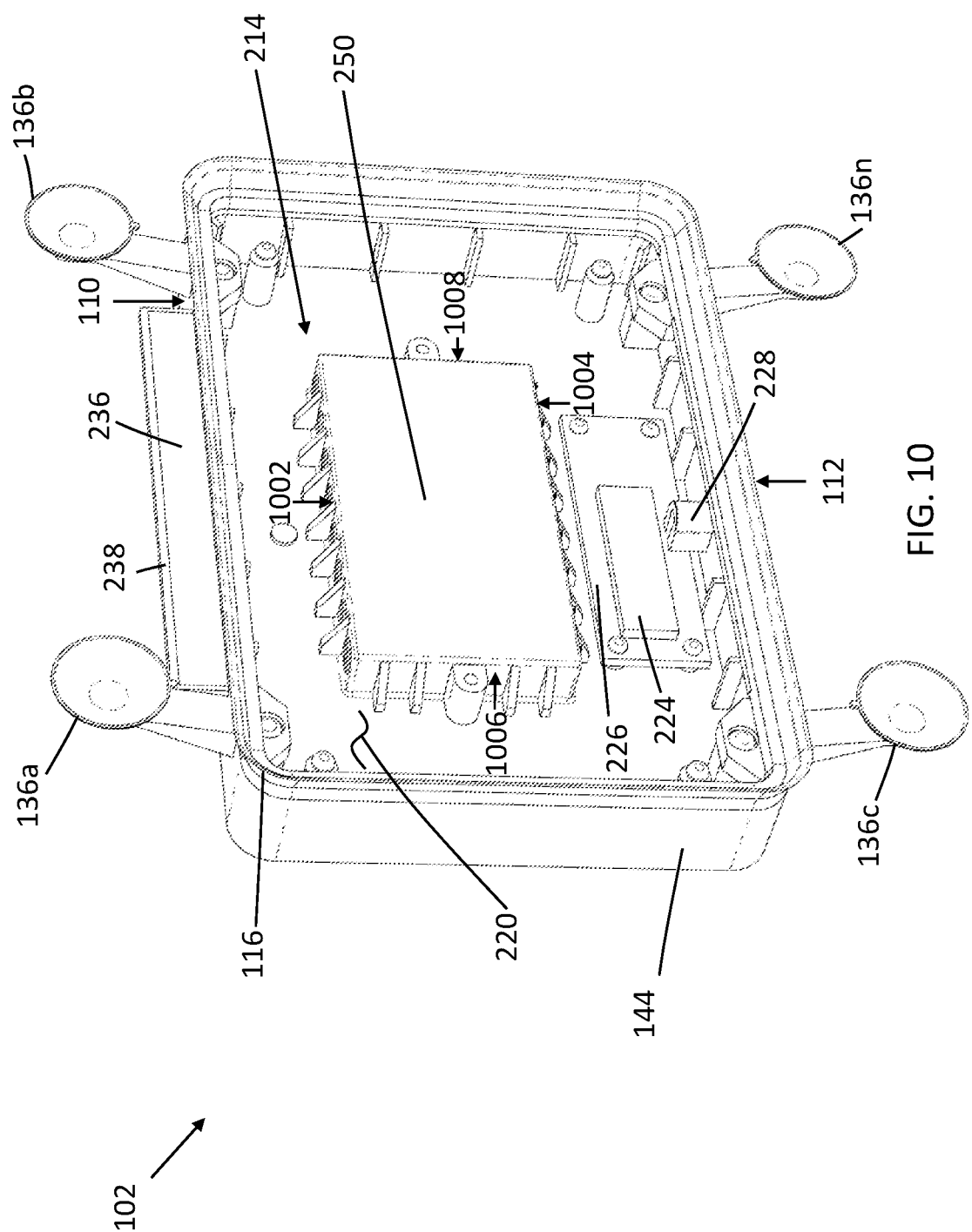
FIG. 10 is a fragmentary perspective view the assembly in FIG. 1 in accordance with one embodiment of the present invention.

In other embodiments, best depicted in FIGS. 2, 9, and 10, the window mountable illuminated sign assembly 100 may be powered by a plurality of batteries (not shown) electrically coupled to the PCB 226. The plurality of batteries may be placed within a battery cavity 250. The battery cavity 250 is disposed on the rear surface 108 of the sign shell 144 in a rear-facing orientation (in a direction opposite from the front surface 120 of the translucent front panel 118). Additionally, access to the battery cavity 250 is located on the rear surface 108 of the sign housing 102 and may be covered by a selectively removably coupled cover panel 252. The cover panel 252 may attach to the rear surface 108 of the sign shell 144 utilizing a plurality of screw members 254a-n, where "n" represents any number greater than one. Referring specifically to FIG. 10, the battery cavity 250 further includes an upper end 1002, a lower end 1004 opposing the upper end 1002, a left end 1006, and a right end 1008 opposing the left end 1006. Referring back to FIG. 2, the battery cavity 250 also includes a plurality of battery spring contacts 256a-n, where "n" represents any number greater than one, disposed on the upper end 1002 of the battery cavity 250. Moreover, the battery cavity 250 includes a plurality of battery spring plates 258a-n, where "n" represents any number greater than one, disposed on the lower end 1004. The electrically conductive charging and receiving prongs 256a-n, 258a-n may be of a metallic material such as, for example, copper.

In other embodiments, the assembly 100 may incorporate one, all, or any combination, without limitation, of the batteries (not shown), photovoltaic cell 236, and/or wire connection 104 so that a user may have the option to choose the method of power.

Figure 5:
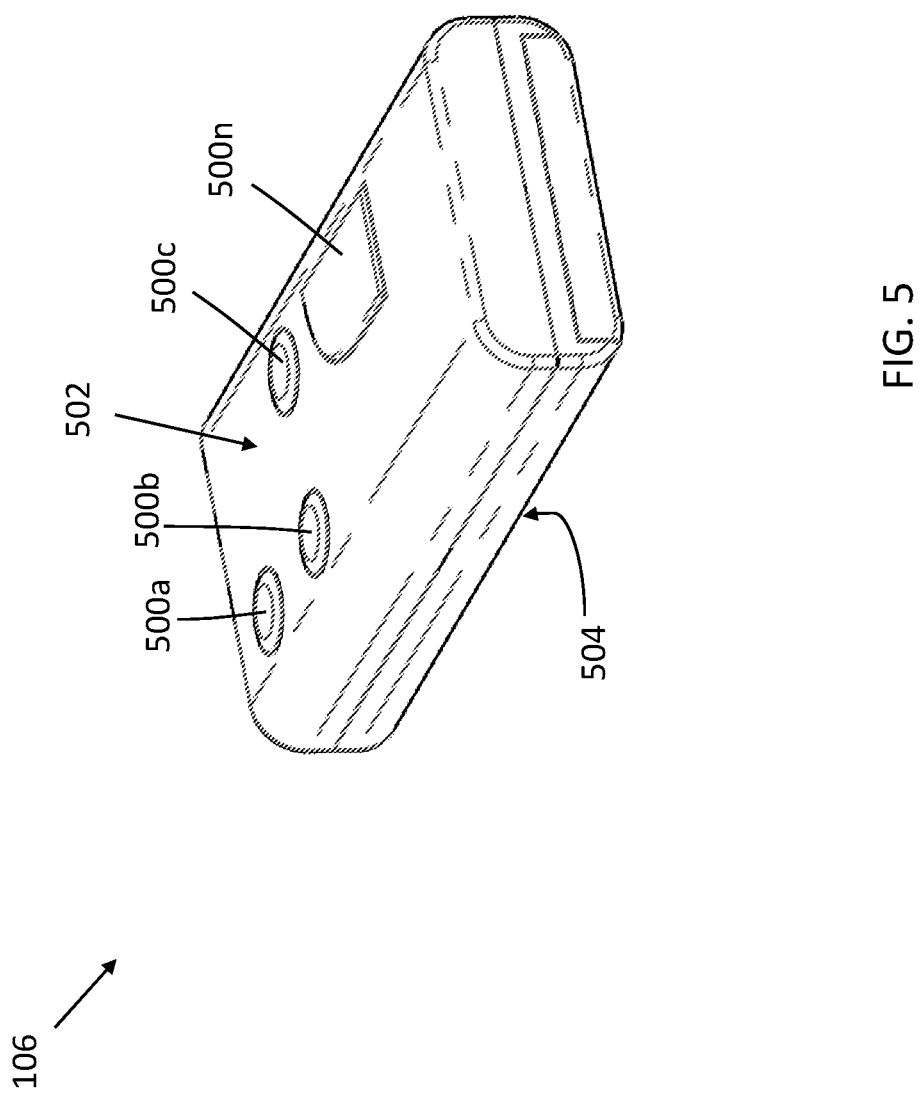
FIG. 5 is a close-up perspective view of the remote control in FIG. 1 in accordance with one embodiment of the present invention.
Figure 6:
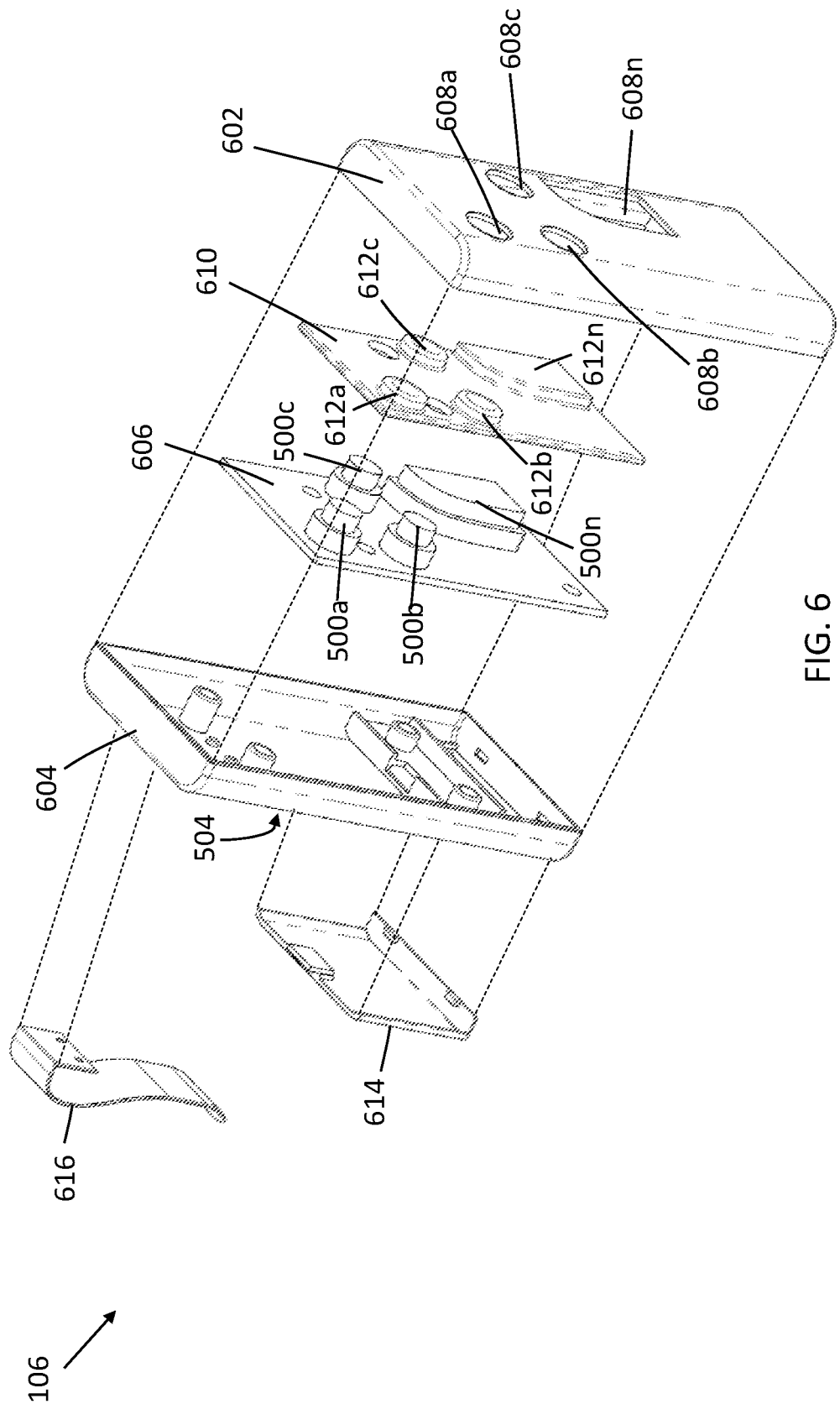
FIG. 6 is an exploded view of the remote control in FIG. 5.

Referring now to FIGS. 5-6, the remote control 106 functions as a transmitter operably configured to transmit pulses of infrared light (not shown). The remote control 106 includes a front surface 502 and a rear surface 504. The remote control 106 further includes a plurality of buttons 500a-n, where "n" represents any number greater than one, disposed on the front surface 502. Each of the plurality of buttons 500a-n is associated with a separate command, which may be, for example, an on/off button, a brightness adjuster, a button to change the mode (e.g., flashing, blink three times, constantly on, etc.). For example, when a user presses on at least one of the plurality of buttons 500a-n, the remote control 106 generates pulses of infrared light (not shown) that represent specific binary codes. Each of the binary codes correspond to a separate command. The commands corresponding to each of the plurality of buttons 500a-n on the remote control 106 are communicated to a receiver (not shown) on the assembly 100 operably configured to receive information. In one embodiment, a first button, e.g., button 500a, on the remote control 106 initiates a command for the LED panel 204 to generate a continuous emission of light at one intensity for a particular period of time, e.g., until the user deactivates the emission (by depressing a button, e.g., button 500a or 500b) or upon reaching a timing deadline (e.g., 5 minutes). As such, the sign indicia 122 is noticeably displayed to the viewing public, thereby detracting following vehicle(s) from coming too close and providing safety to the vehicle carrying the assembly 100. If a car is still approaching or coming too close, another button, e.g., button 500b or 500c, on the remote control 106 initiates a command for the LED panel 204 to generate a pulsed emission of light at one intensity for a particular period of time. To further detract the following vehicle(s), the intensity of the pulsed emission of light may be greater than the first emission of light. In additional embodiments, the additional button may just initiate a higher intensity of emitted light at a continuous rate, rather than being pulsed.

In other embodiments, the remote control 106 may instead transmit command codes by utilizing Bluetooth technology or Zigbee. The remote control 106 may include a Bluetooth transceiver to transmit information and the assembly 100 may include a receiver operably configured to receive Bluetooth information.

In a further embodiment, best depicted in FIG. 6, which illustrates a perspective view of the remote control 106 in an exploded state, the remote control 106 comprises an upper casing member 602 and a lower casing member 604 fixed to each other for defining an interior space therebetween to accommodate circuit assembly 606. The circuit assembly 606 includes the plurality of buttons 500a-n. The upper casing member 602 includes shaped orifices 608a-n, where "n" represents any number greater than one. Shaped orifices 608a-n provide access to a rubber button cover 610 that includes shaped grooves 612a-n, where "n" represents any number greater than one, shaped and sized to surround the plurality of buttons 500a-n. Although a particular number of buttons 500a-n are depicted, the circuit assembly 606 may include more or less. The amount of buttons 500a-n, shaped orifices 608a-n, and shaped grooves 612a-n correspond with respect to one another. Said another way, there are an equal amount of shaped orifices 608a-n and shaped grooves 612a-n as there are buttons 500a-n.

In a further embodiment, still referring to FIG. 6, the remote control 106 may be powered by a plurality of batteries (not shown). The remote control 106 includes a battery door 614 removably coupled to the rear surface 504 which provides access to the plurality of batteries (not shown) powering the remote control 106. Further, the remote control 106 may include a clip member 616 disposed on the rear surface 504 to facilitate adherence to a surface, e.g., a dashboard of a vehicle (not shown), which makes the remote control 106 easily accessible for the user while driving. In other embodiments, the remote control 106 may couple to a surface by another means.

Figure 7:
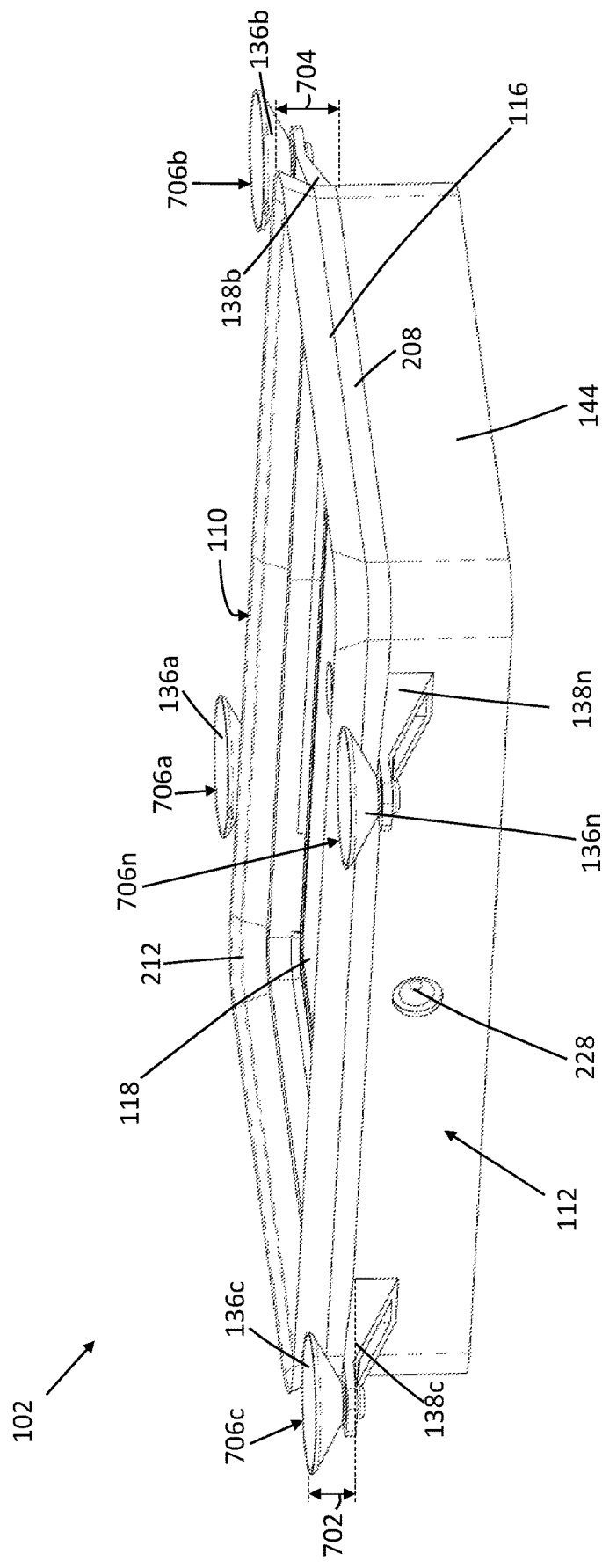
FIG. 7 is a perspective view of the housing in FIG. 1 in accordance with one embodiment of the present invention.
Figure 8:
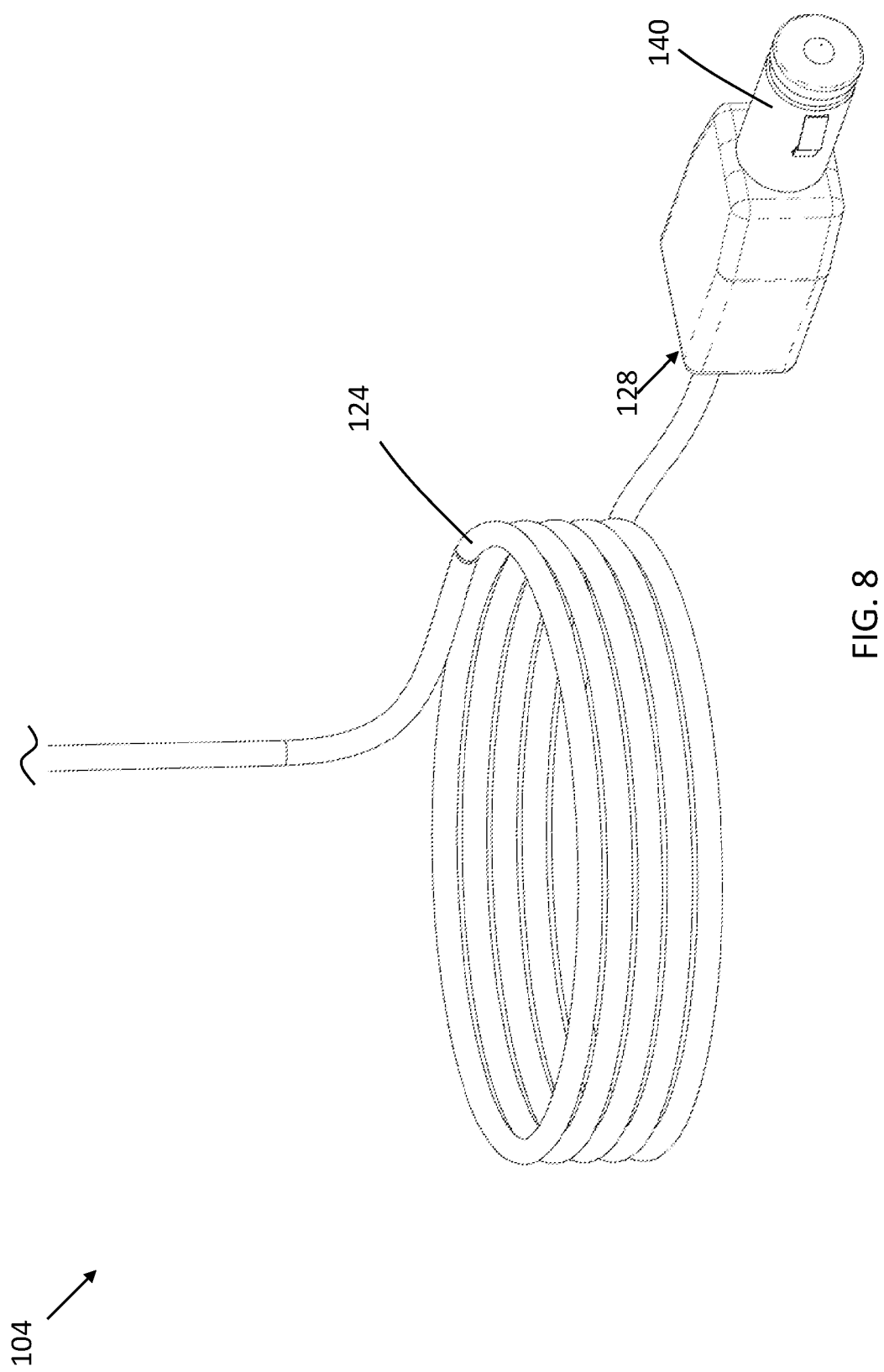
FIG. 8 is a perspective view of the wired connection of the assembly in FIG. 1 in accordance with one embodiment of the present invention.

Referring now to FIG. 7, the suction cup fasteners 136a-n, in addition to the flange 116, are each designed to be flexible (e.g., having a static configuration, shown in FIG. 10, and a flexed or deformed configuration, shown in FIG. 11), such that distal flange edge 212, around a perimeter of the sidewall 208 of the flange, is flush with the rear window of the vehicle sign housing 102 is capable of laying flush against at least one of the rear windows 304, 306 (shown in FIG. 3). As may be seen in FIG. 7, the suction cup fasteners 136a-n each have a length 702 while the flange 116 has a length 704 with respect to the front surface 120 of the front panel 118. The lengths 702, 704 may be substantially equal (e.g., equal or within approximately 10-15% difference) with respect to one another allowing the sign housing 102 to lay flush against at least one of the rear windows 304, 306 (shown in FIG. 3). In addition, the suction cup arms 138a-n dispose the plurality of suction cup fasteners 136a-n proximal to (e.g., at or within approximately 1-2 inches behind or in front of) the distal flange edge 212 of the sidewall 208 of the flange 116. The plurality of suction cup arms 138a-n may also dispose the plurality of suction cup fasteners 136a-n in a configuration with the front panel 118 interposed between the plurality of suction cup fasteners 136a-n and an interior surface 214 (shown in FIG. 2) of the sign housing 102 and/or LED panel 204.

Still referring to FIG. 7, the plurality of suction cup fasteners 136a-n each further include a plurality of distal terminal ends 706a-n, where "n" represents any number greater than one. Each of the plurality of suction cup arms 138a-n may dispose each of the distal terminal ends 706a-n in a configuration with the distal flange edge 212, such that the distal flange edge 212 of the sidewall 208 of the flange 116 is interposed between the distal terminal ends 706a-n of the plurality of suction cup fasteners 136a-n and the front panel 118.

In one embodiment, the window mountable illuminated sign assembly 100 is configured to be command activated by an "on/off" button (not shown) disposed on the sign housing 102. In other embodiments, the window mountable illuminated sign assembly 100 is configured to be command activated by one of the plurality of buttons 500a-n located on the remote control 106.

In yet other embodiments, the window mountable illuminated sign assembly 100 is configured to be brake-activated by the brakes located on the vehicle (not shown) such that when a user steps on a brake pedal (not shown), the window mountable illuminated sign assembly 100 simultaneously receives a signal at the PCB 226 which illuminates the assembly 100. The PCB 226 is communicatively coupled to the brakes located on the vehicle.

In some embodiments, the window mountable illuminated sign assembly 100 may include a sensor (not shown) coupled to the housing 102 and operably configured to detect a motion in a near proximity (e.g., within approximately 15-20 feet) to front surface 120 of the translucent front panel 118 and, upon detection of the motion, send an activation signal to the PCB 226. The sensor is communicatively and operably coupled to the PCB 226. Once the activation signal is received by the PCB 226, the LED panel 204 illuminates for a period of time (e.g., approximately 30 seconds) or until the activation signal terminates.

In some embodiments, when the sensor (not shown) detects a motion, depending on the proximity of the motion, the sensor is operably configured to send different activation signals to the PCB 226. For example, when the motion is within 15-20 feet from the front surface 120 of the translucent front panel 118, the sensor will send an activation signal to constantly illuminate the LED panel 204 for a period of time (e.g., approximately 30 seconds) or until the activation signal terminates; and when the motion is within 5-10 feet from the front surface 120 of the translucent front panel 118, the sensor will send an activation signal to flash the LED panel 204 for a period of time (e.g., approximately 30 seconds) or until the activation signal terminates.

Referring now to FIG. 9, in a further embodiment, the suction cup fasteners 136*a-n* each further include a rear terminal end 904*a-n*, where "n" represents any number greater than one. Each of the plurality of suction cup arms 138*a-n* are shaped and sized to surround each of the rear terminal ends 904*a-n* of each plurality of suction cup fasteners 136*a-n*.

Figure 11:
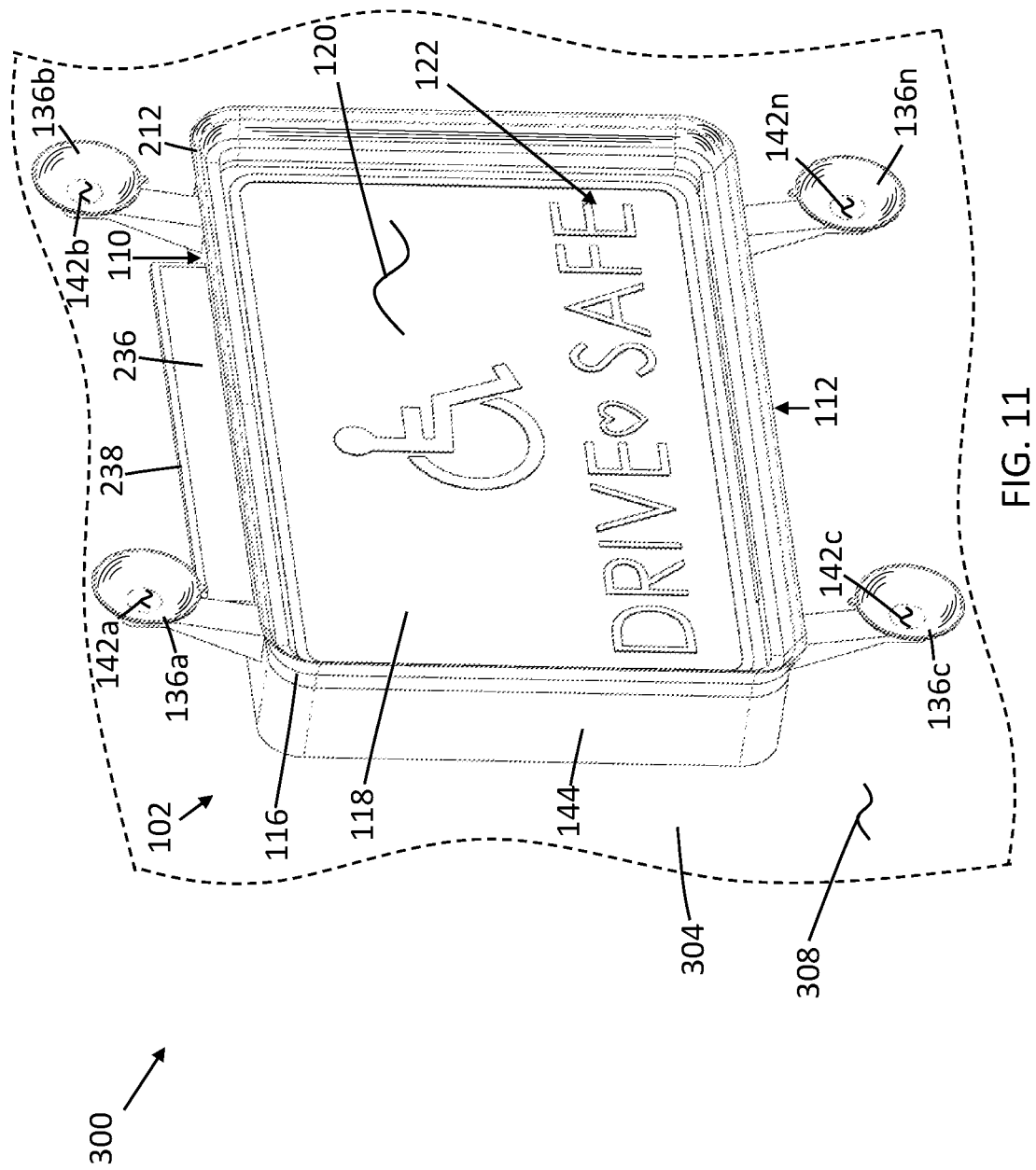
FIG. 11 is a perspective view the assembly in FIG. 1 attached to a sectioned rear window of a vehicle in accordance with one embodiment of the present invention.

With reference to FIG. 11, which shows an exemplary embodiment of the present invention, the housing 102 is coupled to the sedan 300 (shown in FIG. 3). The sedan 300 has a plurality of windows (not shown), which includes the rear window 304. In this embodiment, the distal flange edge 212 of the flange 116 of the housing 102 is directly coupled to the rear window 304 and disposed on the interior surface (not shown) which opposes the exterior surface 308 of the vehicle 300. As such, the flange 116 is disposed in a flexed and deformed configuration. Further, each of the concave cut cavities 142*a-n* of the plurality of suction cup fasteners 136*a-n* are disposed in a flexed and deformed configuration facing and directly coupled to the interior surface (not shown) of the rear window 304 to retain the sign housing 102 thereon.

It should be understood that terms such as, "front," "rear," "side," top," "bottom," and the like are indicated from the reference point of a viewer viewing the assembly 100 from the perspective of the translucent front panel 118 (see FIG. 1).

A window mountable illuminated sign assembly has been disclosed that includes a translucent front panel with a contrasting message and/or graphics displayed on the front surface. Moreover, the window mountable illuminated sign assembly includes a bordering flange and a plurality of suction cup fasteners that are each individually and independently operably configured to efficiently and effectively flex and deform, allowing for placement of the assembly onto a rear window of a vehicle. Additionally, the window mountable illuminated sign assembly includes a variety of powering and/or charging options and a remote control operable to change the sign's illumination options and control various other features of the sign assembly.

What is claimed is:

1. A window mountable illuminated sign assembly comprising:
   a sign housing with a rear surface, an upper end, a lower end opposing the upper end of the sign housing, and a sidewall having an upper sidewall edge spanning a perimeter thereon;
   an electrical circuit disposed within the sign housing and electrically and operably coupled to a plurality of light emitting diodes (LEDs) operably configured to project light and oriented in a front-facing orientation;
   a flange coupled to and surrounding the upper sidewall edge, the flange of a flexible and deformable polymeric material and having a sidewall with an inner surface and a distal flange edge;
   a translucent front panel directly coupled to the inner surface of the sidewall of the flange, having a front surface opposing the rear surface of the sign housing and interposed between the rear surface of the sign housing and the distal flange edge, and having a lettered and contrasting indicia disposed on the front surface of the front panel;
   a plurality of suction cup fasteners coupled to the sign housing, each defining a concave cut cavity facing the front-facing orientation;
   a first plurality of suction cup arms, each with one of the plurality of suction cup fasteners coupled thereto, and a second plurality of suction cup arms, each with one of the plurality of suction cup fasteners coupled thereto; and
   a first plurality of sign sidewall edge recesses defined on the sidewall of the sign housing, each sized and shaped to receive one of the first plurality of suction cup arms and second plurality of sign sidewall edge recesses defined on sidewall of the sign housing, each sized and shaped to receive one of the second plurality of suction cup arms, wherein the first and second plurality of suction cup arms dispose the plurality of suction cup fasteners in a configuration with the front panel interposed between the plurality of suction cup fasteners and an inside surface of the sign housing.

2. The window mountable illuminated sign assembly according to claim 1, further comprising:
   an LED panel disposed proximal and coupled to an inside surface of the sign housing, the LED panel defining an LED panel front surface area defined by a perimeter thereon and having the plurality LEDs disposed on a front surface thereon in a tightly spaced configuration substantially covering the LED panel front surface area.

3. The window mountable illuminated sign assembly according to claim 2, wherein the front panel further comprises:
   a front surface area defined by a perimeter of the front panel, the front surface area substantially equaling the LED panel front surface area.

4. The window mountable illuminated sign assembly according to claim 2, wherein:
   the front panel is substantially planar.

5. The window mountable illuminated sign assembly according to claim 1, further comprising:

at least one photovoltaic cell coupled to the sign housing and facing the front-facing orientation, the at least one photovoltaic cell electrically coupled to the electrical circuit.

6. The window mountable illuminated sign assembly according to claim 1, further comprising:
a direct current (DC) power source electrically and operably coupled to the electrical circuit.

7. The window mountable illuminated sign assembly according to claim 1, further comprising:
a sensor coupled to the sign housing and operably configured to detect a motion in a near proximity to front surface of the front panel and, upon detection of the motion, send an activation signal to the electrical circuit.

8. The window mountable illuminated sign assembly according to claim 1, wherein:
the first plurality of sign sidewall edge recesses are disposed on the upper end of the sidewall of the sign housing; and
the second plurality of sign sidewall edge recesses are disposed on the lower end of the sidewall of the sign housing.

9. The window mountable illuminated sign assembly according to claim 8, wherein:
the first and second plurality of suction cup arms dispose the plurality of suction cup fasteners proximal to the distal flange edge of the sidewall of the flange.

10. The window mountable illuminated sign assembly according to claim 9, wherein:
the first and second plurality of suction cup arms dispose a distal terminal end of the plurality of suction cup fasteners in a configuration with the distal flange edge of the sidewall of the flange interposed between the distal terminal end of the plurality of suction cup fasteners and the front panel.

11. The window mountable illuminated sign assembly according to claim 1, wherein each of the plurality of suction cup fasteners further comprise:
a distal terminal end, wherein the distal flange edge of the sidewall of the flange is interposed between the distal terminal end of each plurality of suction cup fasteners, respectively, and the front panel.

12. In combination with a vehicle having a plurality of windows, including a rear window, the improvement comprising:
a rear-window mounted illuminated sign assembly that includes:
a sign housing with a rear surface, an upper end, a lower end opposing the upper end of the sign housing, and a sidewall having an upper sidewall edge spanning a perimeter thereon;
an electrical circuit disposed within the sign housing and electrically coupled to a power source and electrically and operably coupled to a plurality of light emitting diodes (LEDs) operably configured to project light and oriented toward the rear window of the vehicle;
a flange coupled to and surrounding the upper sidewall edge, of a polymeric material, having a sidewall with an inner surface and a distal flange edge directly coupled to the rear window of the vehicle, the flange disposed in a flexed and deformed configuration;
a translucent front panel directly coupled to the inner surface of the sidewall of the flange, having a front surface opposing the rear surface of the sign housing and interposed between the rear surface of the sign housing and the distal flange edge, and having a lettered and contrasting indicia disposed on the front surface of the front panel;
a plurality of suction cup fasteners coupled to the sign housing, each defining a concave cut cavity facing the rear window of the vehicle and each directly coupled to the rear window of the vehicle to retain the sign housing thereon;
a first plurality of suction cup arms, each with one of the plurality of suction cup fasteners coupled thereto, and a second plurality of suction cup arms, each with one of the plurality of suction cup fasteners coupled thereto; and
a first plurality of sign sidewall edge recesses defined on the sidewall of the sign housing, each sized and shaped to receive one of the first plurality of suction cup arms and second plurality of sign sidewall edge recesses defined on sidewall of the sign housing, each sized and shaped to receive one of the second plurality of suction cup arms, wherein the first and second plurality of suction cup arms dispose the plurality of suction cup fasteners in a configuration with the front panel interposed between the plurality of suction cup fasteners and an inside surface of the sign housing.

13. The improvement according to claim 12, wherein:

the distal flange edge, around a perimeter of the sidewall of the flange, is flush with the rear window of the vehicle.

14. The improvement according to claim 12, wherein:

the first plurality of sign sidewall edge recesses are disposed on the upper end of the sidewall of the sign housing; and the second plurality of sign sidewall edge recesses are disposed on the lower end of the sidewall of the sign housing.

15. The improvement according to claim 14, wherein:

the first and second plurality of suction cup arms dispose the plurality of suction cup fasteners proximal to the distal flange edge of the sidewall of the flange.

16. The improvement according to claim 15, wherein:

the first and second plurality of suction cup arms dispose a distal terminal end of the plurality of suction cup fasteners in a configuration with the distal flange edge of the sidewall of the flange interposed between the distal terminal end of the plurality of suction cup fasteners and the front panel.

\* \* \* \* \*